Patented Aug. 14, 1945

2,382,167

UNITED STATES PATENT OFFICE 2,382,167

BENZENE-SULPHONAMIDO DERIVATIVES AND PROCESS OF MAKING SAME

Max Hartmann, Riehen, and Jean Druey, Basel, Switzerland, assignors to Ciba Pharmaceutical Products, Incorporated, Summit, N. J., a corporation of New Jersey No Drawing. Application April 23, 1941, Serial No. 390,012. In Switzerland June 1, 1940

9 Claims. (Cl. 260—239.6)

This invention relates to the manufacture of new hydroxylamino derivatives of the benzene-sulphonamido-thiazole series by causing a reducing agent to act on a nitro- or nitroso-derivative of the benzene-sulphonamido-thiazole series or by causing an oxidizing agent to act on an amino-derivative of an N-mono-substituted amino-derivative of this series.

The reduction or oxidation may be conducted by methods known in organic chemistry for the preparation of aryl-hydroxylamines (compare Richter-Anschütz, "Chemie der Kohlenstoffverbindungen," 12th edn., Vol. 2, pages 78–80 [1935], J. Houben, "Die Methoden der organischen Chemie," 3rd edn., Vol. 2, pages 175–178 and pages 403–409 [1925]). For reduction of the nitro- or nitroso-group there may advantageously be used zinc dust, amalgams such as a zinc or aluminium amalgam, ammonium- or alkali-sulphides or sulph-hydrates, stannous chloride and so on, in the presence of water and/or an organic solvent such as alcohol, dioxane or the like. Electrolytic or catalytic methods of reduction may also be used. Reduction by means of hydrogen in presence of a catalyst of the platinum group such as palladium, or in the presence of nickel or cobalt or mixtures of catalysts and the like, has proved to be particularly advantageous. In this procedure it has been found, surprisingly, that after absorption of the quantity of hydrogen required for the formation of the hydroxylamino compound no further hydrogen is absorbed. The oxidation of amino- or N-mono-substituted amino-benzene-sulphonamido-thiazoles may be conducted by means of inorganic and organic peracids and peroxides, for example by means of mono-sulpho-peracid.

As parent materials for the invention there may be used for example, benzene-sulphonamido-thiazoles which are substituted in the benzene nucleus, particularly in para-position, by a nitro-, nitroso-, amino-, alkylamino- or acyl-amino-group and may contain in the thiazole residue substituents such as alkyl-, oxy-, alkoxy-, carboxy- or carbalkoxy-groups.

The following compounds, for example, may be made in accordance with the invention: 2-[para-hydroxylaminobenzenesulphonamido] - thiazole, 2 - [para-hydroxylaminobenzenesulphonamido]-4-methyl-thiazole, 2-[para-hydroxylaminobenzenesulphonamido]-4-ethyl-thiazole, 2 - [para-hydroxylaminobenzenesulphonamido] - 4:5 - dimethyl-thiazole, 2-[para-hydroxylaminobenzenesulphonamido]-4-methyl-4:5 - dihydro-thiazole, 2 - [para-hydroxylaminobenzenesulphonamido]- 5-carbethoxy-thiazole and 2-[para-methylhydroxylaminobenzenesulphonamido]-thiazole.

Further benzene-sulphonamido groups may be interposed between the hydroxylamino-benzenesulphonamido-group and the thiazole group. Thus 2-[para-(para'-hydroxylaminobenzenesulphonamido)-benzenesulphonamido]-thiazole may be obtained for example, by reduction of the corresponding nitro-compound, which may itself be prepared by the action of chloro-sulphonic acid on para-nitrobenzene-sulphonic acid anilide and reaction of the resulting para-(para'-nitrobenzenesulphonamido)-benzenesulphonic acid chloride with 2-aminothiazole, for example in pyridine.

The compounds obtainable in accordance with the invention form soluble salts with alkalis, alkaline earths and organic bases.

The products may be converted in manner itself known into various acyl-derivatives of organic or inorganic acids.

The new compounds are distinguished by a particularly high activity in the case of illnesses resulting from infection.

The following examples illustrate the invention, the parts being by weight:

Example 1

14 grams of 2-[para-nitrobenzenesulphonamido]-thiazole (prepared by reaction of para-nitrobenzene-sulphonic acid chloride with 2-amino-thiazole for example in pyridine) are dissolved in 700 cc. of alcohol of 96 per cent strength and at room temperature dry ammonia gas and then hydrogen sulphide are introduced into the solution. The solution is then strongly cooled and ammonia and hydrogen sulphide are introduced until the solution is super-saturated with these gases. The reaction mixture is then allowed to stand for some time in an ice chest and is then poured into cold water and acidified with acetic acid. After the whole has been allowed to stand for a day, the mixture of 2-[para-hydroxylaminobenzenesulphonamido] - thiazole and sulphur which has precipitated, is filtered. The solid matter is extracted with boiling water and filtered hot. From the filtrate 2-[para-hydroxylaminobenzenesulphonamido]-thiazole separates in the form of nearly white needles. A further quantity can be obtained by saturating the acetic acid mother liquor with common salt.

The same compound can also be obtained by cautious oxidation of 2-[para-amino-benzenesulphonamido]-thiazole with monosulphoperacid.

The 2-[para-hydroxylaminobenezensulphonamido]-thiazole crystallizes from water in the form of white or yellowish needles. It is moderately soluble in water, methyl alcohol and ethyl alcohol at a raised temperature. It is dissolved easily by alkalis, alkaline earths, ammonia, alkali-carbonates, pyridine and the like, to form yellow solutions. It is also soluble in mineral acids which are not too dilute. It reduces silver nitrate solution, alkaline with ammonia, at a raised temperature, and when heated with benzaldehyde in alcoholic solution forms a condensation product in the form of leaflets. When heated in a small melting point tube it becomes dark from 170° C. upwards and melts with decomposition at 240–250° C. If a sample in a small tube is introduced into a mass having a temperature of 210–215° C. it melts with foaming and again solidifies.

By reaction of the 2-[para-hydroxylaminobenzenesulphonamido]-thiazole in aqueous solution with acetic anhydride an acetyl compound is obtained which is very sparingly soluble and does not melt even at 320° C.

*Example 2*

45 parts of 2-[para-nitrobenzenesulphonamido]-thiazole are shaken in 500 parts of alcohol with hydrogen in presence of 15 parts of a palladium charcoal catalyst of 10 per cent strength. After the quantity of hydrogen, calculated for the reduction of the nitro-group to a hydroxylamino-group, has nearly been absorbed, the absorption of hydrogen ceases after about 4½ hours. The reaction mixture is filtered with suction and the residue is extracted with 2500 parts of boiling water and filtered at boiling temperature. On cooling the filtrate, 2-[para-hydroxylaminobenzenesulphonamido]-thiazole is obtained with a yield of 60–70 per cent and may be obtained completely pure by one recrystallization from water. A further small quantity of the product can be obtained from the alcoholic filtrate by evaporation and recrystallization from water.

2-[para-hydroxylaminobenzenesulphonamido]-4-methyl-thiazole, 2-[para-hydroxylaminobenzenesulphonamido]-4-ethyl-thiazole, 2-[para-hydroxylaminobenzenesulphonamido] - 4:5 - dimethyl-thiazole or 2-[para-hydroxylaminobenzenesulphonamido]-5-carbethoxy-thiazole may be produced in similar manner. Instead of the nitro compound, the corresponding nitroso compound may be used as starting material.

These compounds may be obtained also by careful oxidation of the corresponding amino compounds, for example with monosulphoperacid. When using N-mono-substituted compounds as starting materials, for example 2-[para-methylaminobenzenesulphonamido] - thiazole, 2 - [para-benzylaminobenzenesulphonamido]-4-methyl-thiazole or 2-[para-pyridylaminobenzenesulphonamido]-4-ethylthiazole, the corresponding hydroxylamino compounds are obtained therefrom by oxidation, for example 2-[para - methylhydroxylaminobenzenesulphonamido]-thiazole, 2 - [para-benzylhydroxylaminobenzenesulphonamido]-4-methyl-thiazole or 2-[para - pyridylhydroxylaminobenzenesulphonamido]-4-ethyl-thiazole. The starting materials may be prepared by the action of the corresponding aldehydes on the amino compounds and subsequent reduction or by reaction of the corresponding halogen hydrocarbons with the amino compounds.

The cited hydroxylamine compounds may be converted into the corresponding acyl compounds by reaction with acid anhydrides or acid chlorides, for example with acetic acid-, propionic acid-, capric acid-, benzoic acid- or nicotinic acid-anhydride or -chloride.

Salts of the above indicated compounds may be obtained by reacting these compounds with alkalis, alkaline earths or organic bases, for example with calcium hydroxide or aminoethanol, or by double reaction of the corresponding salts. In this manner for instance the calcium salt of 2 - [para-hydroxylaminobenzenesulphonamido]-thiazole or of 2-[parahydroxylaminobenzenesulphonamido]-4-methyl-thiazole may be obtained.

What we claim is:

1. Process for the manufacture of 2-[para-hydroxylaminobenzenesulphonamido]-4-methyl-thiazole, comprising causing hydrogen to act on 2 - [para-nitrobenzenesulphonamido]-4-methyl-thiazole in the presence of a catalyst selected from the catalysts of the platinum and nickel groups.

2. Process for the manufacture of 2-[para-hydroxylaminobenzenesulphonamido] - thiazole, comprising causing hydrogen to act on 2-[para-nitro - benzenesulphonamido] - thiazole in the presence of a catalyst selected from the catalysts of the platinum and nickel groups.

3. Process for the manufacture of 2-[para-hydroxylaminobenzenesulphonamido]-4-methyl-thiazole, comprising causing hydrogen to act on 2 - [para - nitro - benzenesulphonamido] - 4-methyl-thiazole in the presence of palladium.

4. Process for the manufacture of 2-[para-hydroxylaminobenzenesulphonamido] - thiazole, comprising causing hydrogen to act on 2-[para-nitro - benzenesulphonamido] - thiazole in the presence of palladium.

5. The calcium salt of 2-[para-hydroxylaminobenzenesulphonamido]-4-methyl-thiazole.

6. The calcium salt of 2-[para-hydroxylaminobenzenesulphonamido]-thiazole.

7. 2 - [para - hydroxylaminobenzenesulphonamido]-thiazole.

8. A member of the group consisting of the 2 - (para-hydroxylaminobenzenesulphonamido) - 4-methyl-thiazole which is free from other substituents and the 2-(para-hydroxylaminobenzenesulphonamido)-thiazole which is free from other substituents, and its calcium salt.

9. The calcium salt of a member of the group consisting of the 2-(para-hydroxylaminobenzenesulphonamido)-4-methyl-thiazole which is free from other substituents and the 2-(para-hydroxylaminobenzenesulphonamido) - t h i a z o l e which is free from other substituents.

MAX HARTMANN.
JEAN DRUEY.